No. 820,283. PATENTED MAY 8, 1906.
C. CLAMOND.
PROCESS AND APPARATUS FOR SEPARATING MIXED GASES.
APPLICATION FILED AUG. 31, 1905.
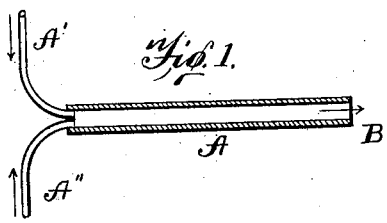
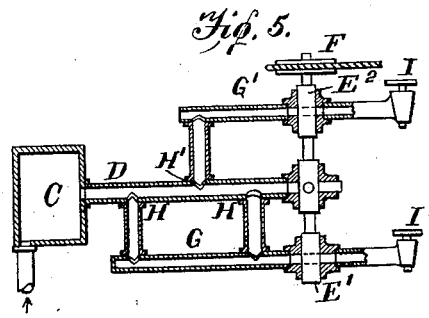
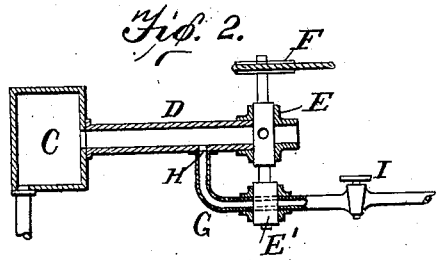
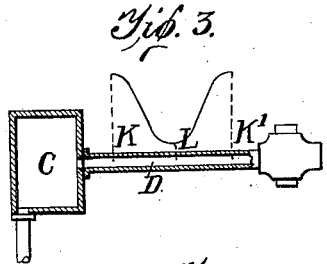
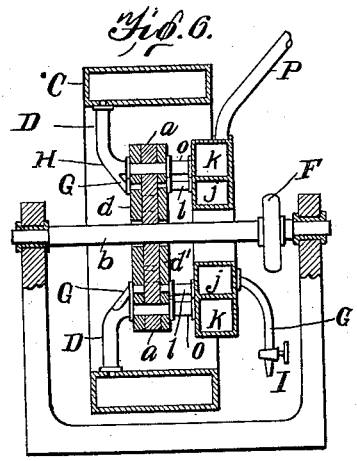
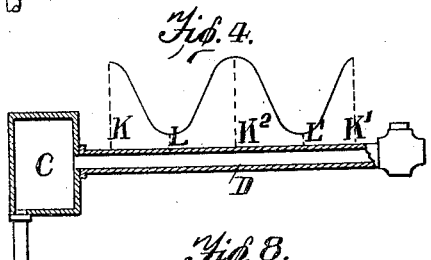
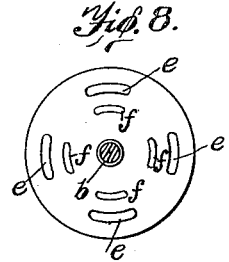
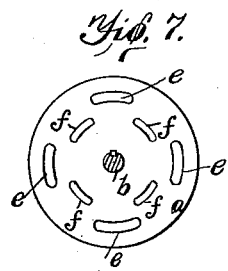
Witnesses
L. O. Wilson.
C. E. Marshall.
Inventor
Charles Clamond,
By Lyons & Bissing.
Attorneys

UNITED STATES PATENT OFFICE.

CHARLES CLAMOND, OF PARIS, FRANCE.

PROCESS AND APPARATUS FOR SEPARATING MIXED GASES.

No. 820,283. Specification of Letters Patent. Patented May 8, 1906.

Application filed August 31, 1905. Serial No. 276,626.

*To all whom it may concern:*

Be it known that I, CHARLES CLAMOND, a citizen of the Republic of France, and a resident of Paris, in the Republic of France, have invented certain new and useful Improvements in the Methods of and Apparatus for Separating Mixed Gases, of which the following is a specification.

My invention has reference to a method of and apparatus for separating from each other mixed gases of different specific gravities, and while the invention is applicable to the separation of all sorts of mixed gases of different specific gravities I have particularly in view the separation of oxygen from the nitrogen of atmospheric air, this being at the present state of the art the most profitable use of my invention from an industrial point of view.

The invention is, however, also important in its application to other gas mixtures, such as the mixture of hydrogen and carbonic acid in water-gas, &c.

I have discovered that if a mixture of two gases of different specific gravities is caused to flow through a pipe and if the flow of gas is periodically arrested in front the two gases become more or less separated in the pipe or channel to which they are confined. Upon this discovery my invention is based, and in the accompanying drawings, which form a part of this specification, I have illustrated certain apparatus which I have used in the practice of the invention, and particularly in the separation of the two gases which constitute atmospheric air—namely, nitrogen and oxygen.

In the drawings, Figure 1 represents diagrammatically an arrangement explanatory of the conditions under which mixed gases will not separate. Fig. 2 represents a longitudinal section, partly in elevation, of a simple apparatus for carrying out my process. Figs. 3 and 4 illustrate the phenomena of gas separation discoverable by means of the apparatus shown in Fig. 2. Fig. 5 is a longitudinal section of a more highly organized apparatus for separating mixed gases. Fig. 6 illustrates a longitudinal section of a modified apparatus for separating gases, and Figs. 7 and 8 are details thereof.

Like letters of reference indicate like parts throughout the drawings.

Referring to Fig. 1, there is indicated a pipe A, into which two smaller pipes A' A² may be supposed to discharge oxygen and nitrogen in the proportion in which these gases occur in atmospheric air, as indicated by the arrows. These two gases will mix within the pipe A, and if the pipe is long enough the mixture will be perfect, and at the open end B of the pipe there will be received atmospheric air. From this it follows that when a gas mixture flows continuously through a pipe or other passage no separation of the gases occurs. If, however, the free opening B of the pipe A is suddenly closed, I conceive that the nitrogen and oxygen which had been mixed within the pipe will under the momentum which they have acquired tend to continue to move in the direction toward the closed opening, and the oxygen being the heavier of the two gases will move farther than the nitrogen, so that at some point or points of the pipe A there will be an excess of oxygen and at another point or points of the pipe A there will be an excess of nitrogen. This was my theoretical conception of my present invention, and I have verified the same by means of an apparatus constructed like that shown in Fig. 2. In this apparatus C represents a chamber into which air is compressed and maintained at a practically uniform pressure by any well-known or improved means. From the chamber C leads a pipe D, which near its free open end has a rotary valve E, driven by a belt applied to a pulley F or in any other desirable manner. By this arrangement the flow of the gas mixture through the pipe D is periodically arrested in front, and the separation of the two gases in the manner hereinbefore described takes place. The reality of this separation is demonstrated by the contrivances shown in Fig. 2. G is a pipe, communicating with the pipe D at some point H between the chamber C and the rotary valve E, and in this pipe G there is also a rotary valve E', driven synchronously with the valve E; but the port of the valve E' is angularly displaced with reference to the port of the valve E. The exit of the pipe G is controlled by a throttle-valve I. By the use of this apparatus I have found that for a given pressure in the chamber C a given angular displacement of the valves E and E', a given speed of rotation of these valves, and a given set of the throttle I the air issuing at the open end of G will have an excess of oxygen or an excess of nitrogen, according to the position of the tap H. When any of the constants above enumerated is changed, the tap H will generally have to be shifted on the pipe D in order to obtain the maximum excess of oxygen or of nitrogen, as the case may be.

By using different lengths of pipe D and by shifting the tap H along that pipe to different positions I have found the results indicated diagrammatically in Figs. 3 and 4. I have found the distribution of separated gases in the pipe D to be as indicated by the curves in Figs. 3 and 4, in which K K' K² L L' are the ordinates. These curves show that for the shorter pipe (shown in Fig. 3) there are two maxima and one minimum, while in the case of the longer pipe (shown in Fig. 4) there are three maxima and two minima. The points of maxima indicate in this case the positions where the separated mixture is richest in oxygen, while the points of minima indicate the positions where the mixture is richest in nitrogen. Consequently if the tap H is placed to either of the positions K K' K² the gas discharged at the opening of the pipe G will be found to have the maximum obtainable excess of oxygen, while when the tap H is located at either of the points L L' the gas obtained at the exit of pipe G will be found to have the greatest obtainable excess of nitrogen. When the tube D is rather short, only one point of maximum of oxygen is established.

It will be seen from the foregoing that by periodically arresting the continuous flow of two mixed gases of different specific gravity in a pipe the two gases become separated more or less in the pipe in a regular wave form, and I have found that the length of the wave is dependent upon the pressure maintained in the chamber and upon the speed of revolution of the valves E E'.

As examples of the practical use of my invention, I may state that when operating on atmospheric air I have used a pressure equal to a column of water of forty centimeters. The inner diameter of the pipe E, which I ordinarily used, was one centimeter, and the speed of rotation of the valves was seventeen per second, so that the valves were opened and closed thirty-four times per second, and these valves had an angular displacement with reference to each other of about ninety degrees, while the throttle-valve I was wide open. When with this general arrangement the pipe D was made forty centimeters long, I found two maxima of oxygen at K and K' and one maximum of nitrogen at L, as indicated in Fig. 3. The maxima of oxygen were located each about six centimeters from the corresponding end of the pipe, while the maximum of nitrogen was midway between the two maxima of oxygen. When the pipe D was made seventy centimeters long, I obtained three maxima of oxygen and two maxima of nitrogen distributed along the pipe in the manner indicated in Fig. 4, the terminal maxima K and K' being again each about six centimeters from the corresponding end of the pipe, while the intermediate maximum of oxygen was midway between the two terminal maxima. The maxima of nitrogen L L' were located each midway between two succeeding maxima of oxygen.

I have above indicated my conception of the cause of the separation of the gases under the circumstances described and I have stated how and in what manner I have obtained what seems to be a physical demonstration of the correctness of my conception; but my invention is not dependent upon the correctness of my theoretical views, since further investigations may show that my theoretical views are not quite correct or not correct at all. The fact which I have discovered and which is independent of any theoretical conception is that a mixture of two gases of different specific gravities is separated more or less into its constituents when flowing in a pipe or conduit and when the flow is forcibly and periodically arrested. I have found that the pipe D need not be a straight pipe, but may be curved in any desired manner without in any way affecting the result.

From the above it will be clear that the arrangement shown in Fig. 2 is an apparatus of the simplest construction for practicing my process.

A more highly-organized apparatus is delineated in Fig. 5. In this arrangement the pipe D is supposed to be of such length that for the pressure maintained there are formed in the same two points of maximum for the heavier gas (oxygen) and one point of maximum for the lighter gas, (nitrogen.) The points of maxima for oxygen are tapped at H H by the discharge-pipe G, which, as in Fig. 2, has in its passage the rotary valve E' and the throttle-valve I, while the point of maximum for nitrogen is tapped at H' by the pipe G', which is also provided with a rotary valve E² and a throttle-valve I.

A modified apparatus for separating mixed gases is indicated in Figs. 6, 7, and 8. Upon a shaft $b$, rotated by power applied to the pulley F, is keyed a metal disk $a$, which is separately shown in Fig. 7. This disk has four segmental slots $e\ e\ e\ e$, arranged ninety degrees apart from each other, and four other slots $f\ f\ f\ f$, arranged concentrically within the first series, but so as to break joint with the same—that is to say, each forty-five degrees displaced with reference to the slots of the first series. On each side of this disk a is arranged another disk d and d', respectively, one on the left and the other on the right hand side, and these disks are free from the shaft b and are held with gentle pressure against the disk a in any way or manner. These stationary disks d d' are perforated, as indicated in Fig. 8—that is to say, they have also four slots e e e e and four slots f f f f; but the e and the f slots are not angularly displaced with reference to each other, but form pairs on the same radius, so that when the disk a is rotated between the two disks d d' there will be free periodic communication between the e slots of the disks d, a, and d', and while such communication is established there will be no communication between the f slots of the three disks; but after the communication between the e slots has been interrupted the communication between the f slots of the three disks will be momentarily established.

C is an annular chamber, in which a constant air-pressure is maintained in any desirable manner, and from this chamber there issue four pipes D D D D, only two of which are visible in the drawings, and these pipes are curved toward the disk a, as indicated, and are fitted with their inner ends into the segmental slots e of the stationary disk d, or these ends of the pipes are otherwise secured in position to the disk d, so as to establish a fixed communication between the chamber C and the slots e, and for this purpose the inner ends of the pipes D may be slightly flattened and curved to the shape of the segmental slots. On the right-hand side of the stationary disk d' there are two concentric annular chambers j and k, the chamber k being in communication with the e slots in disk d' by short pipes o, while the annular chamber j is in communication with the f slots of the disk d' by short pipes l.

It will be seen from this description that if the disk a is rotated there will be four interruptions of the passages from the chamber C into the chamber k and out by a pipe p for each revolution of the disk, and if air is maintained under constant pressure in the chamber C there will be four puffs of air issuing at the pipe p for each revolution of the disk. Now the pipes D are made of such length that the point of maximum of oxygen in the same will be at the bend of each pipe, and each pipe is tapped at that point, as indicated by the letter H, by the oxygen-discharge pipes G, which lead to and communicate with the f slots in the disk d. With this construction it is evident that air containing an excess of oxygen will pass from each pipe D at the point H through the pipe G and through the slots f in the three disks whenever these slots are in communication into the annular chamber j, and from there by the continuation of pipe G past the throttle I to any place where the oxygen may be used or stored. The air issuing by the pipe p will have an excess of nitrogen and may be allowed to escape or may be utilized, if so desired.

It will be evident from the foregoing description that instead of rotary valves, as shown in Figs. 2 and 5, or a system of perforated disks, as shown in Fig. 6, any other construction that will cause a periodic stoppage of the free current of mixed gases may be employed for practicing my process. Thus, for instance, instead of valves or disks which are rotated by an external power an arrangement of siren disks automatically actuated by the air-pressure may be used, or any other effective means for producing the same result may be employed. It is also evident that the air with an excess of oxygen obtained by this process may be further subjected to the same process one or more times for obtaining air with a still higher percentage of oxygen.

Having now fully described my invention, what I claim, and desire to secure by Letters Patent, is—

1. The process of separating from each other the constituents of mixed gases, which consists in causing the mixture to flow through a conduit and periodically arresting the flow of the mixture, substantially as described.

2. The process of separating from each other and separately discharging the constituents of mixed gases which consists in causing the mixture to flow through a conduit, periodically arresting the flow of the mixture whereby the separation within the conduit is produced, and separately withdrawing each or any of the constituents from the point or points of accumulation in the conduit, substantially as described.

3. The process of separating and separately discharging the constituents of a gas mixture, which consists in causing the mixture to flow through a conduit, periodically arresting the flow of the gas mixture whereby each gas separately accumulates at a different point or points of the conduit, and periodically withdrawing each or any of the constituent gases from the point or points of maximum accumulation, substantially as described.

4. An apparatus for separating the constituents of a gas mixture, consisting of a conduit, means for passing through the same a gas mixture, and means for periodically arresting the flow of gas through the conduit, substantially as described.

5. An apparatus for separating and separately discharging the constituents of a gas mixture, consisting of a conduit, means for passing through the same a gas mixture, means for periodically arresting the flow of the mixture through the conduit and means for periodically tapping the conduit at one or
5 more points for the discharge of the separated gases, substantially as described.

In testimony whereof I have signed my name to this specification in the presence of two subscribing witnesses.

CHARLES CLAMOND.

Witnesses:
 JAMES LYON BOWLEY,
 HANSON C. COXE.